United States Patent
Kasuga

(10) Patent No.: US 9,827,887 B2
(45) Date of Patent: Nov. 28, 2017

(54) VEHICLE SEAT

(71) Applicant: TOYOTA BOSHOKU KABUSHIKI KAISHA, Aichi-ken (JP)

(72) Inventor: Shinnosuke Kasuga, Aichi-Ken (JP)

(73) Assignee: TOYOTA BOSHOKU KABUSHIKI KAISHA, Aichi-Ken (JP)

( * ) Notice: Subject to any disclaimer, the term of this patent is extended or adjusted under 35 U.S.C. 154(b) by 0 days.

(21) Appl. No.: 15/219,836

(22) Filed: Jul. 26, 2016

(65) Prior Publication Data
US 2017/0028883 A1    Feb. 2, 2017

(30) Foreign Application Priority Data

Jul. 31, 2015 (JP) ................................. 2015-151676

(51) Int. Cl.
*B60N 2/42* (2006.01)
*B60N 2/44* (2006.01)
*B60N 2/68* (2006.01)

(52) U.S. Cl.
CPC ...... *B60N 2/44* (2013.01); *B60N 2/68* (2013.01)

(58) Field of Classification Search
CPC .................................... B60N 2/44; B60N 2/68
USPC ............... 297/216.1–216.2, 452.18
See application file for complete search history.

(56) References Cited

U.S. PATENT DOCUMENTS

| | | | | |
|---|---|---|---|---|
| 5,795,024 A * | 8/1998 | Collins | ..................... | B60N 2/23 297/452.18 X |
| 6,398,300 B1 * | 6/2002 | Young | .................. | B60N 2/2213 297/216.13 |
| 6,499,806 B2 * | 12/2002 | Nagayasu | ................ | A47C 7/28 297/452.18 X |
| 6,513,878 B2 * | 2/2003 | Nagayasu | .............. | B60N 2/682 297/452.18 |
| 6,685,272 B1 * | 2/2004 | Bonk | ....................... | B60N 2/23 297/452.18 X |
| 8,353,561 B2 * | 1/2013 | Yamazaki | ................ | B60N 2/44 297/452.38 |
| 8,376,456 B2 * | 2/2013 | Fujita | ....................... | B32B 7/12 297/216.1 |
| 8,523,284 B2 * | 9/2013 | Yamada | .................. | B60N 2/22 297/216.13 |
| 9,039,094 B2 * | 5/2015 | Yamada | ................. | B60N 2/682 297/216.13 |
| 9,114,741 B2 * | 8/2015 | Nagata | ................. | B60N 2/4235 |
| 9,744,883 B2 * | 8/2017 | Nakagawa | ............... | B60N 2/16 |
| 2004/0183356 A1 * | 9/2004 | Philippot | ................ | B60N 2/70 297/452.18 |
| 2012/0217775 A1 * | 8/2012 | Fujita | .................. | B60N 2/4221 297/216.13 |
| 2012/0313408 A1 * | 12/2012 | Nagata | ................. | B60N 2/4235 297/216.1 |

(Continued)

FOREIGN PATENT DOCUMENTS

JP    2010-207374    9/2010
JP    2011-172714    9/2011

*Primary Examiner* — Rodney B White
(74) *Attorney, Agent, or Firm* — Greenblum & Bernstein, P.L.C.

(57) ABSTRACT

A vehicle seat includes a seat frame; and a shield that is fitted to the seat frame. The shield includes a fitting portion that is integrally fitted to the seat frame, and an elastic support portion that is elastically pressed against the seat frame at a position different from a position of the fitting portion.

6 Claims, 10 Drawing Sheets

(56) References Cited

U.S. PATENT DOCUMENTS

| | | | | |
|---|---|---|---|---|
| 2014/0217787 | A1* | 8/2014 | Fukuzawa | B60R 22/1952 |
| | | | | 297/216.1 |
| 2015/0307008 | A1* | 10/2015 | Zaiki | B60N 2/682 |
| | | | | 297/452.18 |
| 2015/0307010 | A1* | 10/2015 | Nakagawa | B60N 2/6009 |
| | | | | 297/452.18 |
| 2017/0028942 | A1* | 2/2017 | Nakagawa | B60N 2/44 |
| 2017/0028943 | A1* | 2/2017 | Nakagawa | B60N 2/6009 |

* cited by examiner

VEHICLE SEAT

INCORPORATION BY REFERENCE

The disclosure of Japanese Patent Application No. 2015-151676 filed on Jul. 31, 2015 including the specification, drawings and abstract is incorporated herein by reference in its entirety.

BACKGROUND OF THE INVENTION

1. Field of the Invention

The invention relates to a vehicle seat. Specifically, the invention relates to a vehicle seat including a seat frame and a shield that is fitted to the seat frame.

2. Description of Related Art

Conventionally, in a vehicle seat, there is known a configuration in which a resin shield is fitted to a lateral portion of a seat cushion, and a connecting portion in which the seat cushion and a seat back are connected to each other via a recliner is covered from the outside (Japanese Patent Application Publication No. 2011-172714 (JP 2011-172714 A)). Specifically, the shield is provided so as to be integrally fitted to a side frame of the seat cushion. The shield covers, from the outside, the connecting portion in which the seat cushion is connected to a side frame of the seat back via the recliner, at a rear end portion of the side frame of the seat cushion.

In the related art, the shield may be broadly fitted (a broad portion of the shield may be fitted) to the side frame of the seat cushion such that the shield is not in a cantilever state. However, in a case where a space that allows the shield to be broadly fitted to the side frame of the seat cushion cannot be secured, abnormal noise and backlash may be caused due to vibrations resulting from a gap that is generated between the shield and the side frame.

SUMMARY OF THE INVENTION

The invention makes it possible to appropriately absorb a gap that is generated between a seat frame and a shield.

An aspect of the invention relates to a vehicle seat including a seat frame; and a shield that is fitted to the seat frame. The shield includes a fitting portion that is integrally fitted to the seat frame, and an elastic support portion that is elastically pressed against the seat frame at a position different from a position of the fitting portion.

According to the above-described aspect of the invention, the gap that is generated between the seat frame and the shield can be elastically suppressed at the elastic support portion. Further, even if the position of the seat frame is set such that the seat frame interferes with the elastic support portion in a region where the elastic support portion of the shield is set, the amount of this interference can be appropriately absorbed through the flexure of the elastic support portion.

In the above-described aspect, the elastic support portion may include a support portion that protrudes from the shield in a direction toward the seat frame, and an elastic portion that further extends from the support portion in the direction toward the seat frame and that is elastically pressed against the seat frame; and the elastic portion may be configured to be more likely to bend than the support portion in response to a load received from the seat frame.

According to the above-described configuration, the elastic support portion can be configured to be stably bent within a narrow flexible range, that is, the elastic support portion can be configured such that the elastic portion can be bent at a position that is made close to the seat frame by the support portion that protrudes from the shield.

In the above-described aspect, the elastic portion may include a flexure portion that extends from the support portion in a direction perpendicular to the direction toward the seat frame, and a protrusion that extends from the flexure portion in the direction toward the seat frame; and the elastic portion may be configured such that a bending load is applied to the flexure portion by pressing the protrusion against the seat frame.

According to the above-described configuration, the elastic portion can be configured to be bent in a stable deformation mode, that is, the elastic portion can be configured such that flexure portion can be bent in a beam-bending manner by applying a bending load to the flexure portion.

In the above-described aspect, the elastic portion may be configured to be supported at both ends thereof by the support portion.

According to the above-described configuration, the elastic portion can be provided such that a large stable resilient force can be produced.

In the above-described aspect, the protrusion may be provided at a central location of a region of the elastic portion, the region being supported at both ends thereof.

According to the above-described configuration, the elastic portion can be provided such that the elastic portion can be efficiently bent.

In the above-described aspect, the elastic portion may be provided at a distal end portion of the support portion that protrudes.

According to the above-described configuration, the elastic support portion can be configured such that the elastic portion can be stably bent within a narrow flexible range, that is, the elastic portion can be stably bent at a position that is appropriately made closer to the seat frame.

BRIEF DESCRIPTION OF THE DRAWINGS

Features, advantages, and technical and industrial significance of an exemplary embodiment of the invention will be described below with reference to the accompanying drawings, in which like numerals denote like elements, and wherein.

DETAILED DESCRIPTION OF EMBODIMENT

An embodiment of the invention will be described hereinafter using the drawings.

Figure 1:
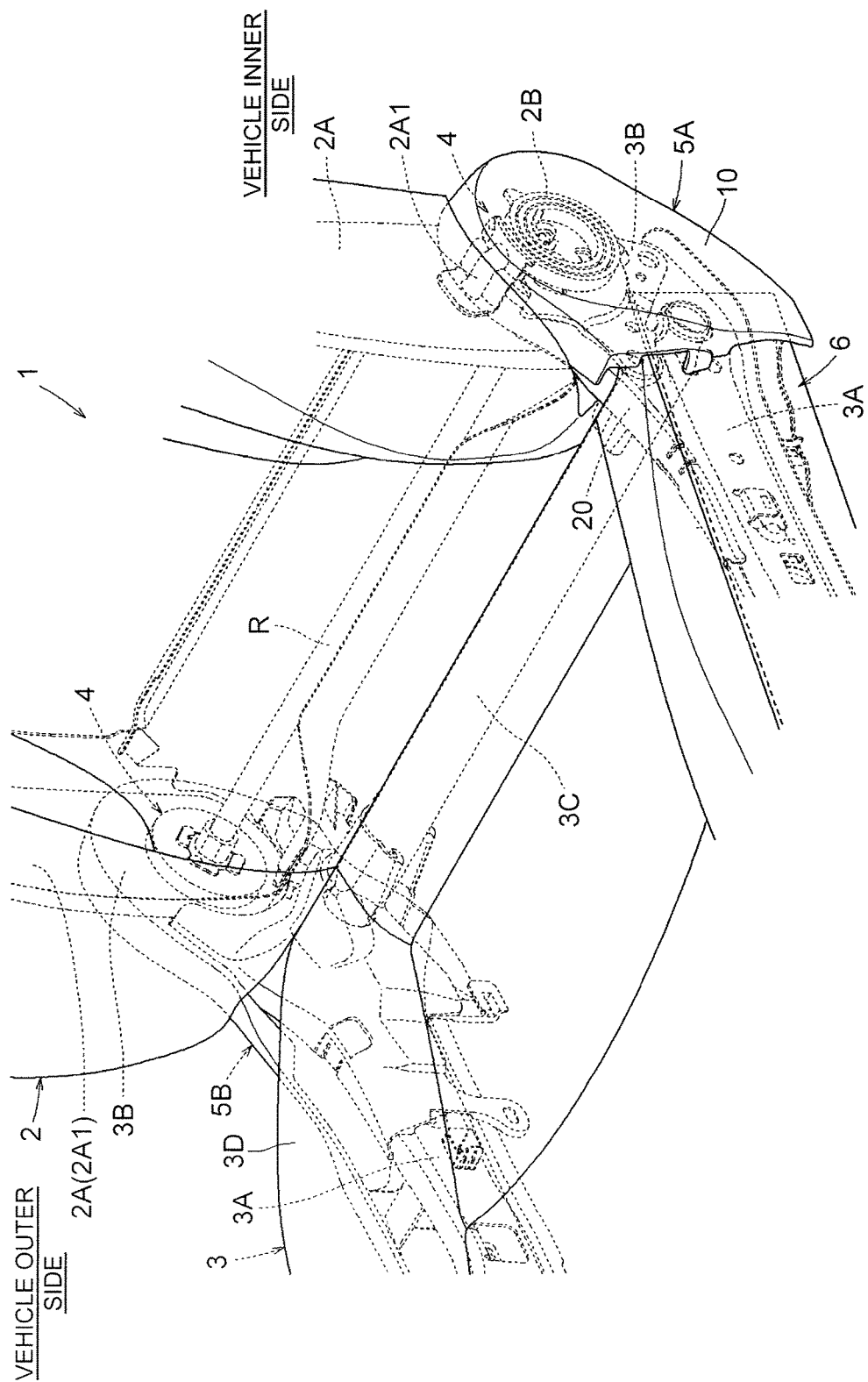
FIG. 1 is a perspective view illustrating the schematic configuration of a vehicle seat according to a first embodiment of the invention.
Figure 2:
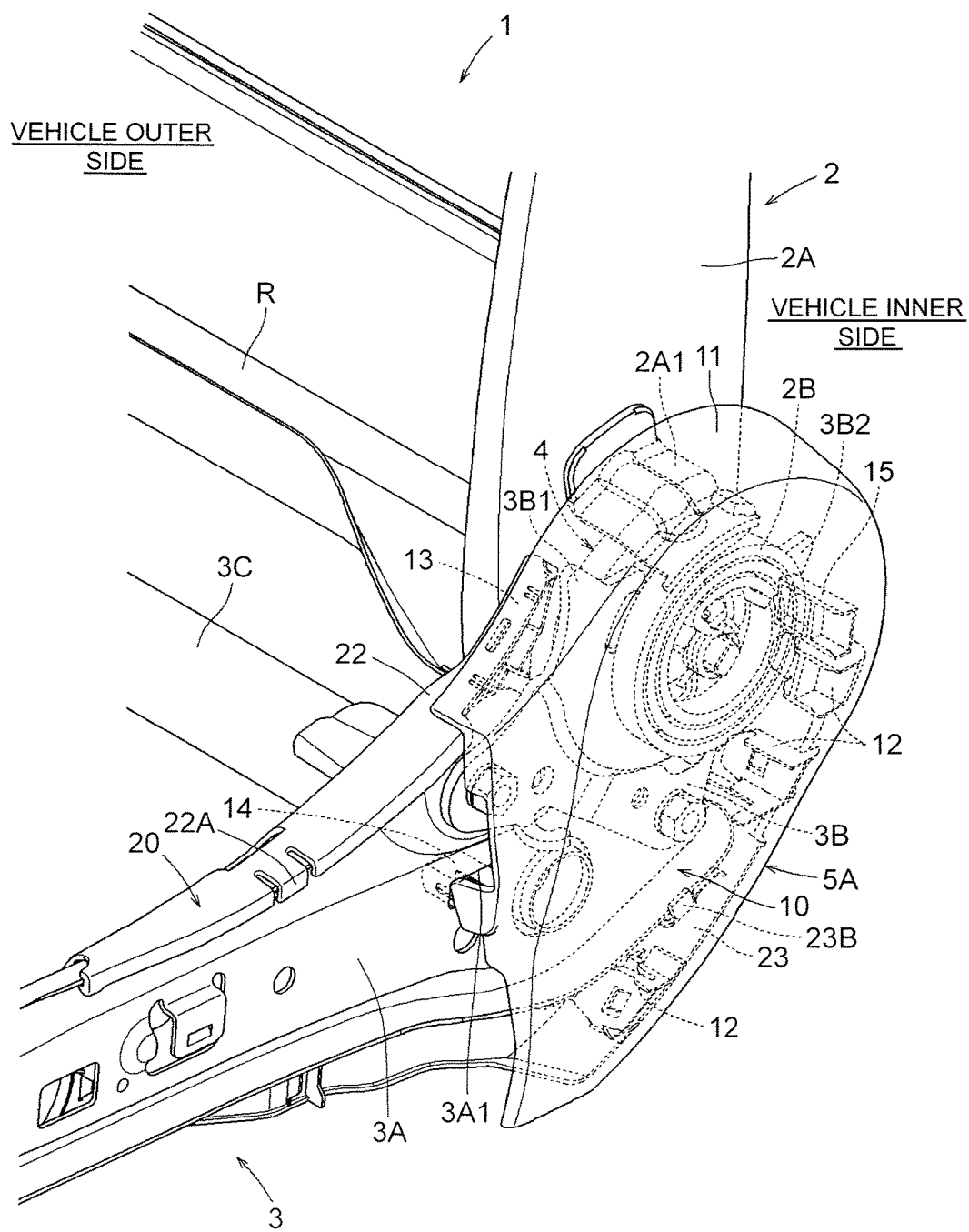
FIG. 2 is a perspective view illustrating a connecting portion including a recliner on an enlarged scale.
Figure 3:
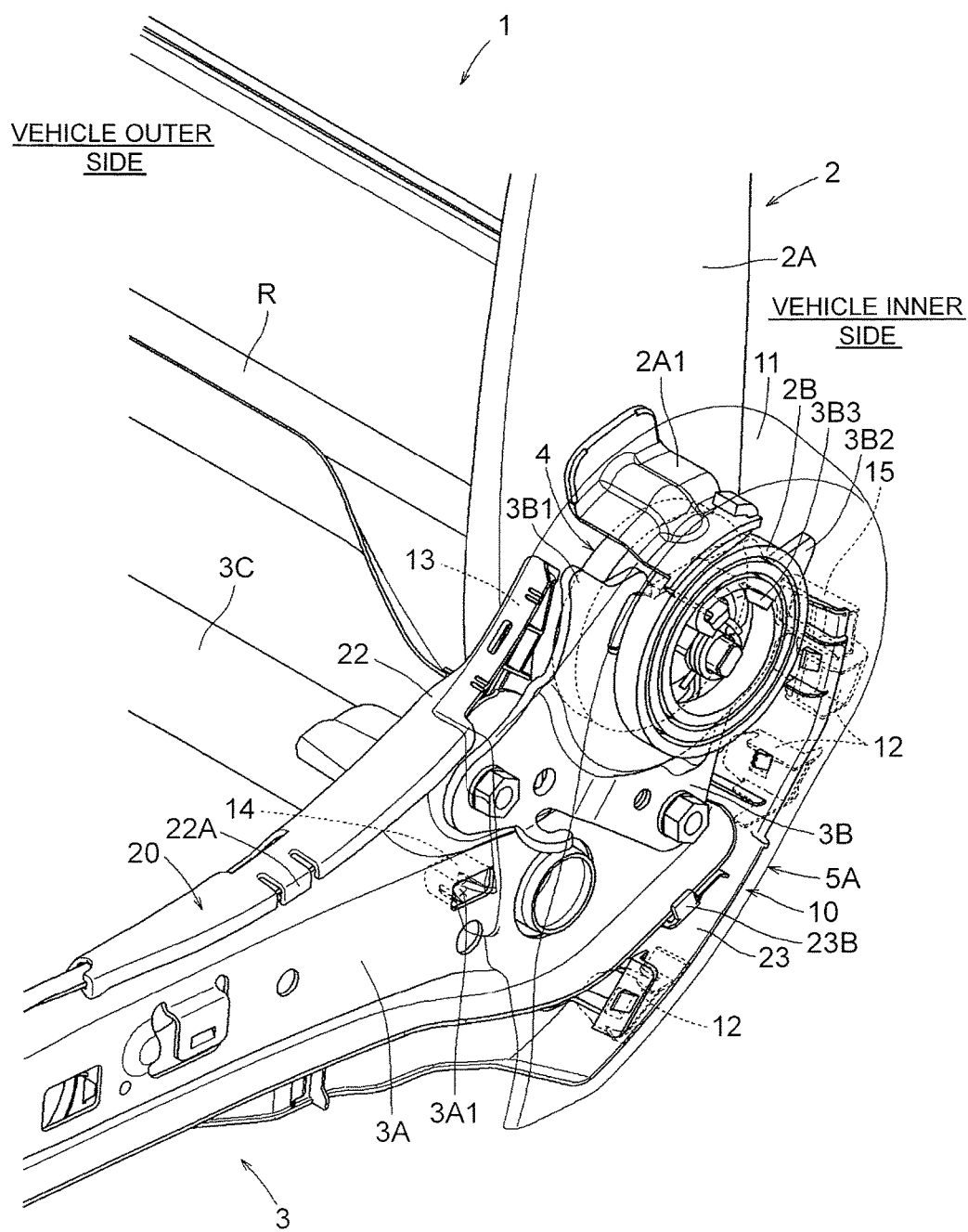
FIG. 3 is a perspective view illustrating the connecting portion including the recliner in a visualized manner.

First of all, the configuration of a seat 1 (a vehicle seat) according to a first embodiment of the invention will be described using FIGS. 1 to 10. The basic configuration of the seat 1 will be described with reference to FIG. 1. As shown in FIG. 1, the seat 1 according to the present embodiment is configured as a right seat of a vehicle (an automobile). The seat 1 includes a seat back 2 that serves as a backrest for a seated occupant, a seat cushion 3 that serves as a seating portion, and a headrest (not shown) that serves as a head support.

The above-mentioned seat back 2 is connected to a rear end portion of the seat cushion 3 via a pair of right and left recliners 4 such that the backrest angle can be adjusted. Each of the recliners 4 is normally brought to, and held in a lock state where the backrest angle of the seat back 2 is fixed. The recliners 4 are concurrently released from the lock state and brought to a state where the backrest angle of the seat back 2 can be changed, that is, the seat back 2 can be inclined in a front-rear direction, through an operation of pulling up a reclining lever (not shown) that is provided at a vehicle outer side lateral portion of the seat cushion 3, the vehicle outer side lateral portion facing a door (not shown) through which an occupant gets in and gets out of the vehicle.

It should be noted herein that the seat back 2 is normally rotationally urged forward by a pair of right and left spiral springs 2B mounted between the seat back 2 and the seat cushion 3. Thus, the seat back 2 is released from a state where the backrest angle thereof is fixed, through the operation of the reclining lever (not shown). The seat back 2 is hence raised to such a position as to be pressed against the back of a seated occupant by urging forces of the spiral springs 2B, and the backrest angle thereof is easily adjusted in accordance with tilting movement of the back of the seated occupant in a front-rear direction.

Specifically, outer lateral face portions in lower end sides of both right and left side frames 2A of the seat back 2 are connected to inner lateral face portions of respective reclining plates 3B that are fastened to rear end portions of both right and left side frames 3A of the seat cushion 3 by bolts, via the respective recliners 4. Connecting portions in which the seat back 2 and the seat cushion 3 are connected to each other via the recliners 4 are shielded, from the outside, by resin shield members 5A and 5B that are attached to lateral portions of the seat cushion 3 on respective sides.

Each of the shield members 5A and 5B is attached such that the reclining plate 3B on each side is sandwiched between an inner part and an outer part of the corresponding shield member 5A or 5B in a width direction, that is, the inner part and the outer part of the corresponding shield member 5A or 5B are disposed on respective sides of the reclining plate 3B. Thus, the shield members 5A and 5B cover the connecting portions in which the seat back 2 and the seat cushion 3 are connected to each other such that the connecting portions are not exposed to the outside in the front-rear direction and are not exposed to the outside in the right-left direction. The shield member 5B on the vehicle outer side is formed in a shape that is long (i.e., that extends) in the front-rear direction, so as to broadly cover an area from a rear end-side lateral region of the seat cushion 3 covering the reclining plate 3B to a front end-side lateral region of the seat cushion 3.

The shield member 5A on the vehicle inner side is formed in such a compact shape as to mainly cover the reclining plate 3B and a surrounding region around the reclining plate 3B. Instead, in a lateral portion region of the seat cushion 3 on the vehicle inner side, a large portion in the front-rear direction thereof is covered by a drooped-shaped thick carpet material 6 that is sewn to a cushion cover 3D that is stretched at the lateral portion. This configuration is adopted for the following reason. The lateral portion of the seat cushion 3 on the vehicle inner side is adjacent to a center console that is disposed between the seat cushion 3 and a left seat (not shown), and it is difficult to see the lateral portion of the seat cushion 3 on the vehicle inner side from the outside. Therefore, the configuration covering the lateral portion is simplified.

The shield members 5A and 5B on the respective sides are attached to the side frames 3A of the seat cushion 3 on the respective sides, protrude rearward and upward from these attachment portions in a cantilever manner, and are provided so as to cover, from a seat outer side, the reclining plates 3B that are connected to the rear end portions of the side frames 3A on the respective sides. Moreover, although the shield members 5A and 5B have such a shape as to protrude rearward and upward in a cantilever manner from the attachment portions attached to the respective side frames 3A as described above, inner lateral face portions of protruding portions of the shield members 5A and 5B partially contact outer lateral face portions of the respective reclining plates 3B, and thus, the protruding portions are restrained so as to prevent backlash of the protruding portions in the width direction. It should be noted herein that the side frames 3A of the seat cushion 3 and the reclining plates 3B that are integrally connected to the rear end portions of the side frames 3A may be regarded as "the seat frame" according to the invention.

Even when the positions of the outer lateral face portions of the respective reclining plates 3B in the width direction are changed on the ground that, for example, the recliners 4 with a different thickness in the width direction are adopted due to a change in the specification of the seat 1, the configuration in which the shield members 5A and 5B are restrained from moving by contacting the outer lateral face portions of the respective reclining plates 3B can function such that the changes are permitted. Specifically, in the configuration in which the shield members 5A and 5B contact the outer lateral face portions of the respective reclining plates 3B, the shield members 5A and 5B are elastically pressed against the outer lateral face portions of the respective reclining plates 3B, and thus, the changes in the positions of the outer lateral face portions of the respective reclining plates 3B in the width direction can be absorbed through elastic flexure.

A connecting structure for connecting the seat back 2 and the seat cushion 3 to each other, and a concrete configuration of the shield members 5A and 5B on the respective sides will be described hereinafter in detail. The connecting structure for connecting the seat back 2 and the seat cushion 3 to each other is constituted by a pair of configurations that are bilaterally symmetrical to each other. Further, the shield members 5A and 5B on the respective sides are different in shape from each other, but each of the shield members 5A and 5B has a double structure constituted by the inner part and the outer part. The shield members 5A and 5B are attached to the respective side frames 3A of the seat cushion 3, and are elastically pressed against the respective reclining plates 3B. That is, the shield members 5A and 5B has the same basic configuration. Accordingly, hereinafter, only one of the respective structures, which is disposed on the vehicle inner side, will be specifically described in detail, as a representative thereof.

Figure 5:
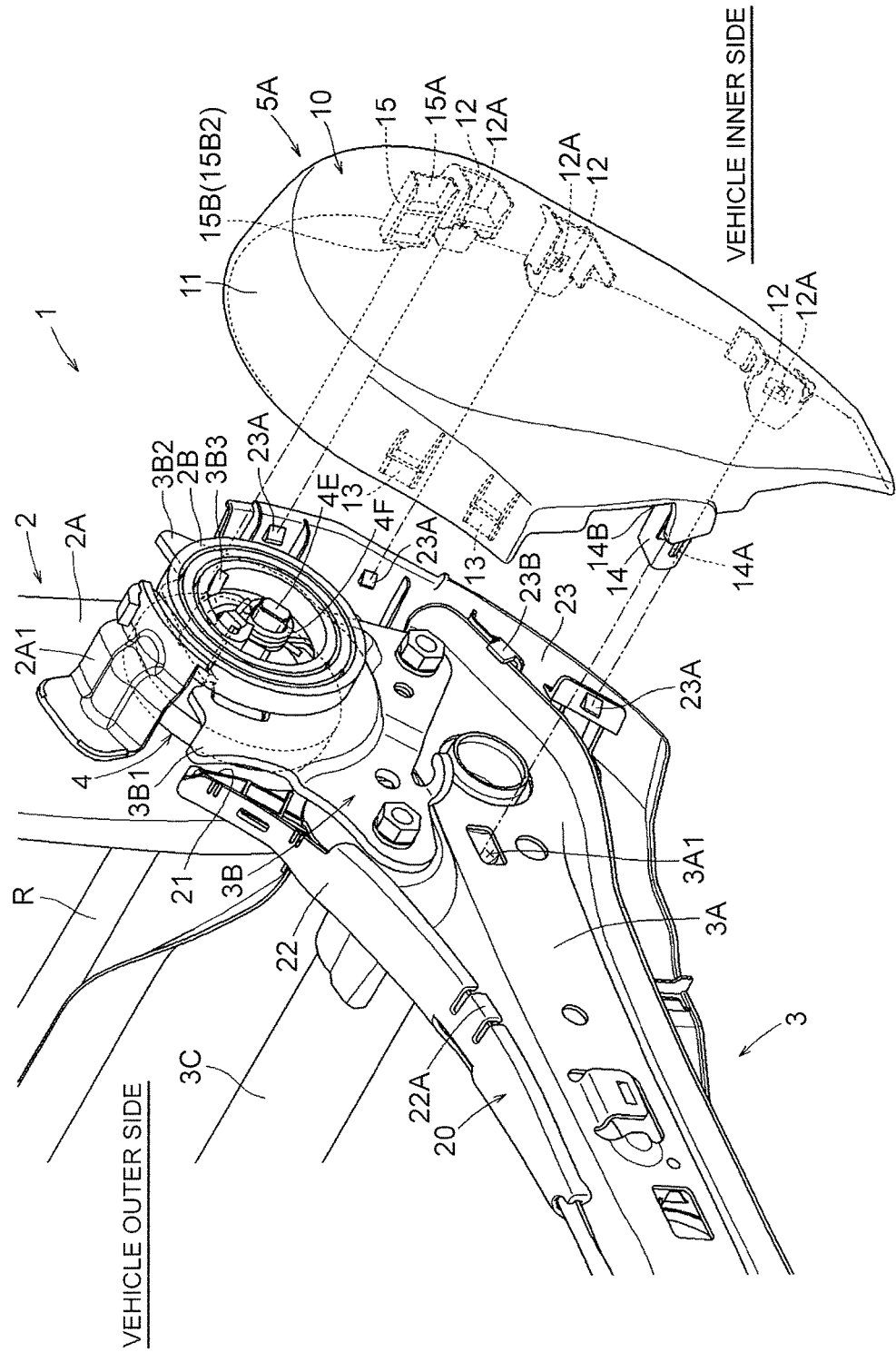
FIG. 5 is an exploded perspective view of the connecting portion from which an outer shield is removed.
Figure 9:
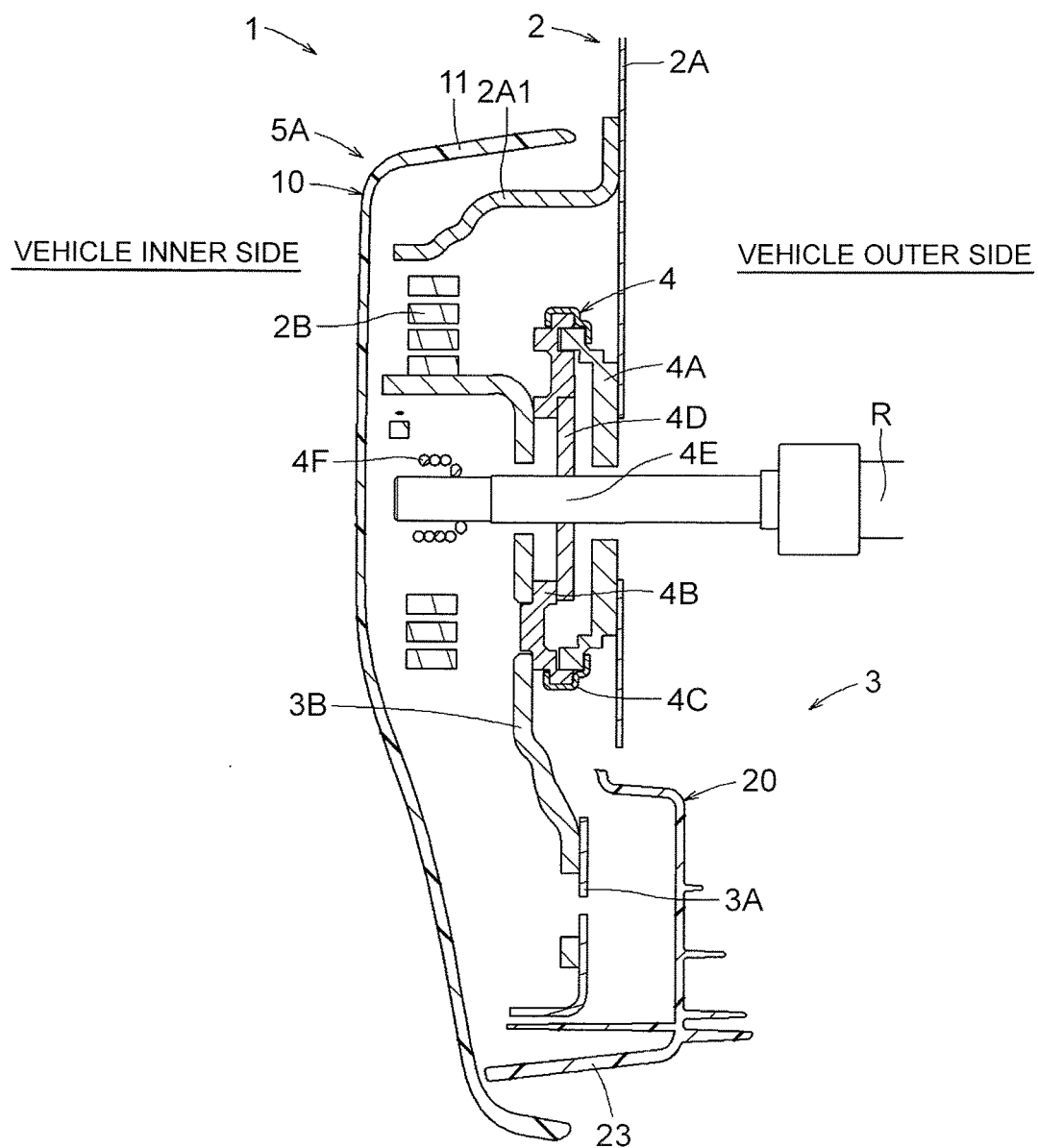
FIG. 9 is sectional view taken along a line IX-IX in FIG. 4.

First of all, the configuration of the recliner 4 will be described. The recliner 4 has a known configuration disclosed in documents such as Japanese Patent Application Publication No. 2010-207374 (JP 2010-207374 A). Therefore, only the structure of a main portion of the recliner 4 will be briefly described hereinafter. As shown in FIGS. 5 and 9, the recliner 4 is disposed so as to be sandwiched between the side frame 2A of the seat back 2 and the reclining plate 3B that is disposed to face the outer side of the side frame 2A in the width direction thereof. The recliner 4 connects the side frame 2A and the reclining plate 3B to each other such that the side frame 2A and the reclining plate 3B can be rotated relatively to each other.

Specifically, as shown in FIG. 9, the recliner 4 includes a disc-shaped ratchet 4A that is connected to the outer lateral face portion of the side frame 2A of the seat back 2, a disc-shaped guide 4B that is connected to the inner lateral face portion of the reclining plate 3B, and a cylindrical outer peripheral ring 4C that is mounted across outer peripheral portions of the ratchet 4A and the guide 4B and holds the ratchet 4A and the guide 4B fitted to each other in an axial direction such that the ratchet 4A and the guide 4B are rotated relatively to each other. Furthermore, the recliner 4 includes a lock structure 4D that is fitted to the inner lateral face portion of the guide 4B and that meshes with the ratchet 4A to lock relative rotation of the ratchet 4A and the guide 4B, an operation shaft 4E that is passed through a central portion of the guide 4B and that performs an operation of releasing a lock state of the lock structure 4D through rotation, and a lock spring 4F that rotationally urges the operation shaft 4E in a lock operating direction.

The ratchet 4A and the guide 4B are fitted to each other in the axial direction. The lock structure 4D normally receives an urging force of the lock spring 4F and is held meshing with the ratchet 4A. Thus, the ratchet 4A and the guide 4B are held in a state where relative rotation thereof is locked. When the operation shaft 4E is turned in a release operating direction through the operation of the reclining lever (not shown), a rotation stop state of both the ratchet 4A and the guide 4B by the lock structure 4D is thereby released, and the ratchet 4A and the guide 4B are brought to a state where the ratchet 4A and the guide 4B can rotate relatively to each other. As shown in FIG. 1, the operation shaft 4E is connected, via a connecting rod R, to the operation shaft 4E that is passed through the recliner 4 on the vehicle outer side, and is turned in the lock release operating direction integrally with the operation shaft 4E on the vehicle outer side.

Figure 4:
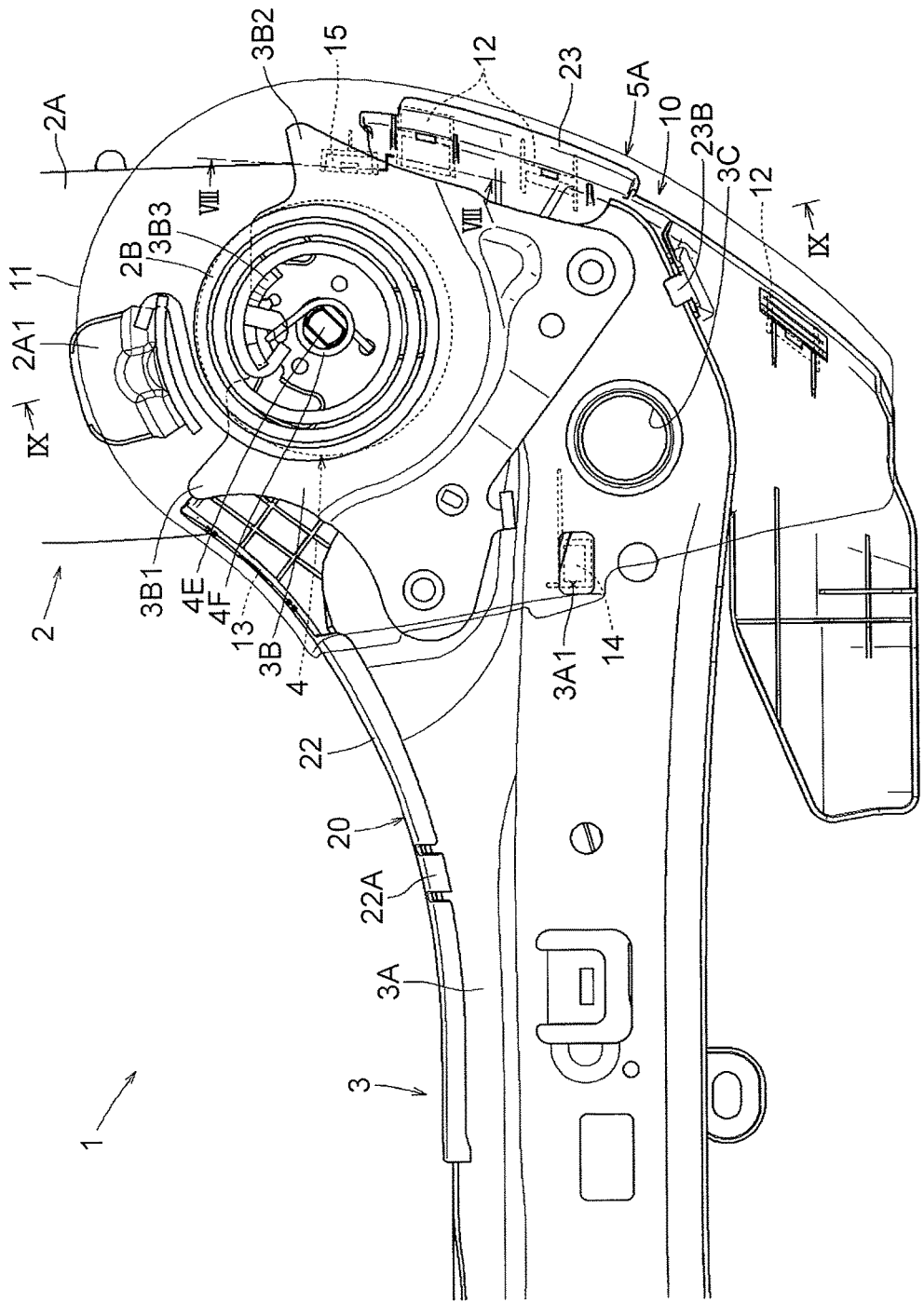
FIG. 4 is a lateral view of the connecting portion.

Next, the configuration of the spiral spring 2B that rotationally urges the seat back 2 forward with respect to the seat cushion 3 will be described. As shown in FIGS. 4, 5 and 9, a radially inner end portion of the spiral spring 2B, which is spirally wound, is hooked from above on a cut-bent piece 3B3 that is formed by cutting a portion of the reclining plate 3B and bending the portion outward. An outer end portion of the spiral spring 2B is hooked from behind on an outward protruding part of a stopper piece 2A1 that is formed of an L-shaped plate that is connected to the outer lateral face portion of the side frame 2A of the seat back 2. Thus, the spiral spring 2B is attached to this cut-bent piece 3B3 and this outward protruding part of the stopper piece 2A1. Due to the attachment, the spiral spring 2B normally urges the seat back 2 in such a direction as to rotate the seat back 2 forward with respect to the seat cushion 3 around the recliner 4.

Next, the configuration of the stopper piece 2A1 will be described. As shown in FIGS. 4 and 5, the stopper piece 2A1 is formed of a plate material that is bent in the shape of the letter "L", and one piece (one side) of the letter "L" is integrally welded to the outer lateral face portion of the side frame 2A of the seat back 2. The stopper piece 2A1 comes into contact with a front engagement protrusion 3B1 or a rear engagement protrusion 3B2, through the tilting of the seat back 2 in the front-rear direction, and thus restricts the adjustment range of the backrest angle of the seat back 2. The front engagement protrusion 3B1 and the rear engagement protrusion 3B2 are formed in the reclining plate 3B to protrude.

Specifically, the stopper piece 2A1 comes into contact with the front engagement protrusion 3B1 that is formed so as to protrude in a horn shape at a location of a front upper-edge portion of the reclining plate 3B, through forward-tilting rotation of the seat back 2, and thus holds the seat back 2 so as to prevent the seat back 2 from making a rotational movement in that direction. Further, the stopper piece 2A1 comes into contact with the rear engagement protrusion 3B2 that is formed so as to protrude in a horn shape at a location of a rear upper-edge portion of the reclining plate 3B, through rearward-tilting rotation of the seat back 2, and thus holds the seat back 2 so as to prevent the seat back 2 from making a rotational movement in that direction.

Next, the configuration of the shield member 5A (5B) will be described. As shown in FIG. 5, the shield member 5A includes an outer shield 10 that covers the reclining plate 3B from the outside, and an inner shield 20 that covers the reclining plate 3B from the inside. Each of this outer shield 10 and this inner shield 20 is formed of a single resin component that has been formed by injection molding. Each of the outer shield 10 and the inner shield 20 is fitted to the side frame 3A of the seat cushion 3. In addition, the outer shield 10 and the inner shield 20 are also fitted to each other such that peripheral edge portions of the outer shield 10 and the inner shield 20 are integrally fitted to each other. It should be noted herein that the outer shield 10 may be regarded as "the shield" according to the invention.

Specifically, the outer shield 10 is formed to have a substantially plate shape that can cover the entire reclining plate 3B from the outside. Specifically, hood portions 11 that protrude inward in the width direction in the shape of a protruding wall are formed on upper and rear peripheral edge portions of the outer shield 10. The outer shield 10 is configured such that the hood portions 11 surround and cover the reclining plate 3B from the outer peripheral side.

Specifically, the upper edge portion of the outer shield 10 has a curved arc shape that protrudes upward in a lateral view. With the use of the hood portion 11 that protrudes inward in the width direction from the upper edge portion, the outer shield 10 also surrounds and covers therein the stopper piece 2A1 that is disposed at a position above the reclining plate 3B (see FIGS. 2 to 4). Because the upper edge-side hood portion 11 of the outer shield 10 has a curved arc shape, the outer shield 10 can cover the stopper piece 2A1 from the outer peripheral side so as to allow the rotational movement of the stopper piece 2A1 in accordance with the tilting of the seat back 2, in an internal space that is covered by this hood portion 11.

Figure 7:
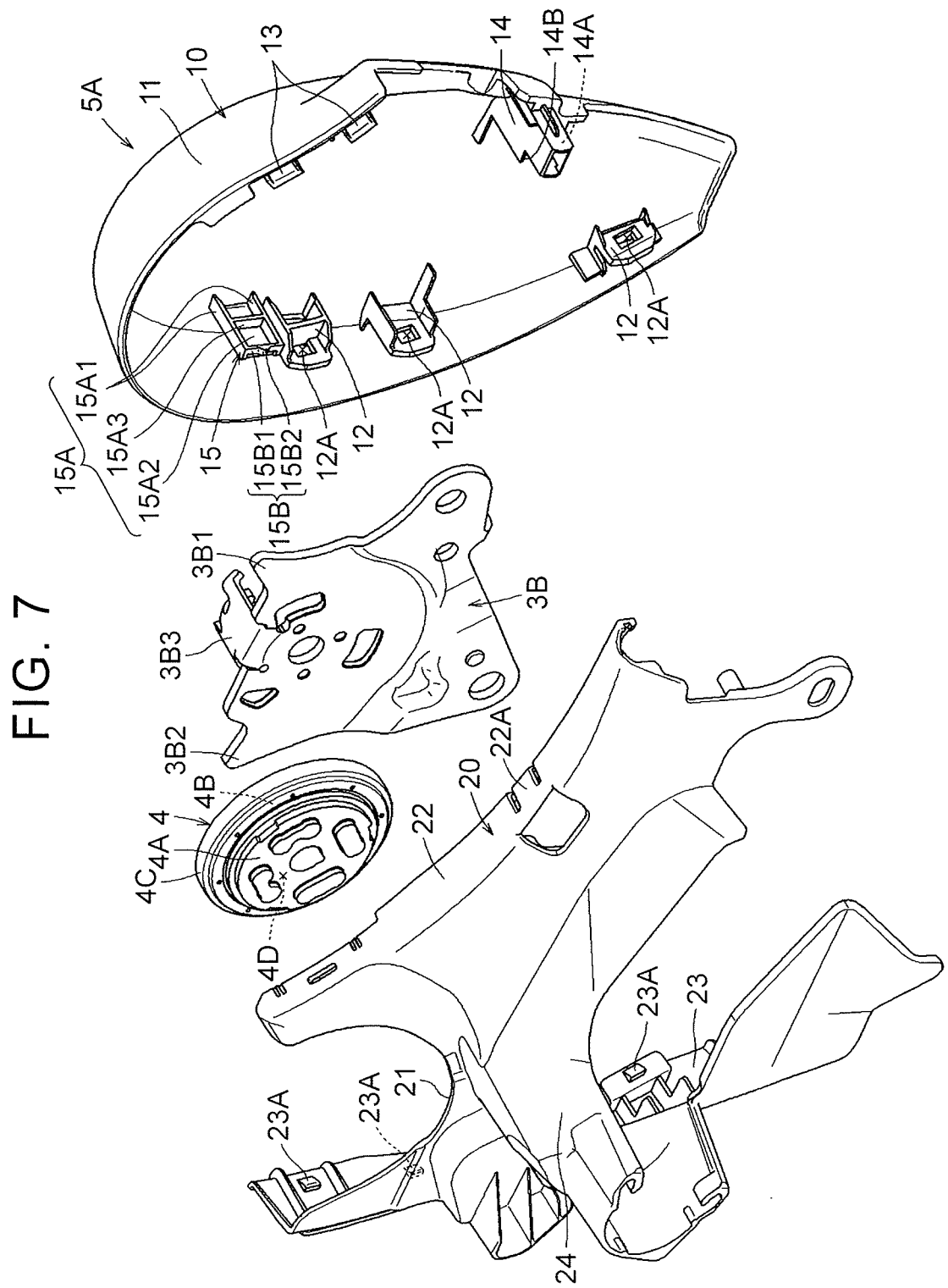
FIG. 7 is an exploded perspective view illustrating a reclining plate and the outer shield.

As shown in FIG. 7, protruding wall portions 12 that protrude inward in the width direction are arranged on the inner lateral face portion of the outer shield 10, at three locations in a height direction, namely, at an upper portion, a central portion and a lower portion along the rear peripheral edge portion of the outer shield 10. The protruding wall portions 12 protrude so as to have a substantially angular U-shaped cross-section, and are reinforced at some positions by ribs. Each of the protruding wall portions 12 is configured such that a rectangular fitting hole 12A extending in the front-rear direction is formed in a face thereof that faces rearward. As shown in FIG. 5, these protruding wall portions 12 function as engagement portions, and fitting lugs 23A, which are formed at corresponding locations in the inner shield 20, are elastically fitted into the fitting holes 12A, when the outer shield 10 is fitted to the later-described inner shield 20 from outside in the width direction.

As shown in FIG. 7, guide wall portions 13 that protrude inward in the width direction and extend along an upper-front inclined peripheral edge portion of the inner lateral face portion of the outer shield 10 are arranged at two locations along the peripheral edge portion on the inner lateral face portion of the outer shield 10. As shown in FIG. 5, these guide wall portions 13 function as engagement portions, and a part of a front hood portion 22 of the later-described inner shield 20 is accommodated and fitted between the guide wall portions 13 and the hood portion 11 of the outer shield 10 when the outer shield 10 is fitted, the hood portion 11 being located on the outer peripheral side with respect to the guide wall portions 13.

As shown in FIG. 7, a fitting portion 14 that protrudes inward in the width direction is formed on the inner lateral face portion of the outer shield 10, at a central location in the height direction along a front peripheral edge portion thereof. The fitting portion 14 protrudes and has a substantially rectangular cross-section, and is reinforced at some positions by a rib. The fitting portion 14 is configured such that a fitting lug 14A that is elastically deformable in the height direction is formed at a lower peripheral wall portion at a distal side of the protruding fitting portion 14 in FIG. 7. As shown in FIG. 5, the fitting portion 14 functions as an engagement portion, and the fitting portion 14 is inserted into a corresponding rectangular fitting hole 3A1 formed to extend through the side frame 3A of the seat cushion 3 and is thus fitted to a peripheral portion around the fitting hole 3A1 so as to be prevented from falling, when the outer shield 10 is fitted.

Specifically, the fitting portion 14 is inserted into the fitting hole 3A1 that is formed to extend through the side frame 3A of the seat cushion 3, and the fitting lug 14A is thereby inserted while being elastically pressed so as to be fitted in the fitting hole 3A1. The fitting lug 14A is inserted to a position so as to pass through the fitting hole 3A1, and the fitting lug 14A is thus restored to its original state and is engaged with the peripheral portion around the fitting hole 3A1. As a result, the fitting portion 14 is engaged with the side frame 3A so as to be prevented from falling.

The fitting lug 14A is inserted to the position at which the fitting lug 14A is engaged with the peripheral portion around the fitting hole 3A1, and the peripheral portion around the fitting hole 3A1 of the side frame 3A is thereby pressed against a stepped engagement portion 14B that is formed on a rear peripheral wall portion of the fitting portion 14. As a result, movement of the fitting portion 14 in an insertion direction with respect to the side frame 3A is also restricted. With the above-described configuration, the fitting portion 14 is attached to the side frame 3A in an integrally engaged state by being inserted into the side frame 3A from the outside. It should be noted herein that the fitting portion 14 may be regarded as "the fitting portion" according to the invention.

Figure 8:
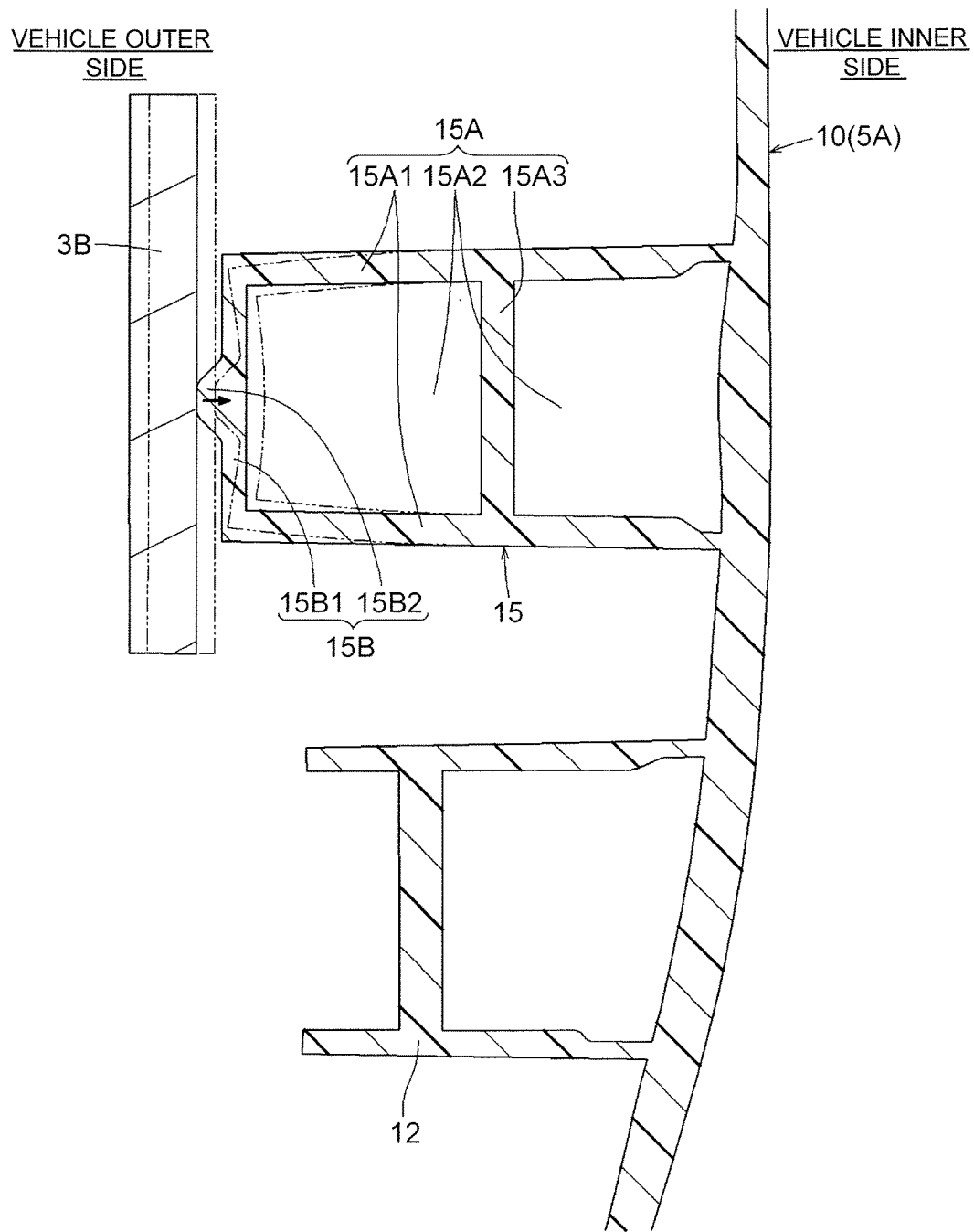
FIG. 8 is a sectional view taken along a line VIII-VIII in FIG. 4.
Figure 10:
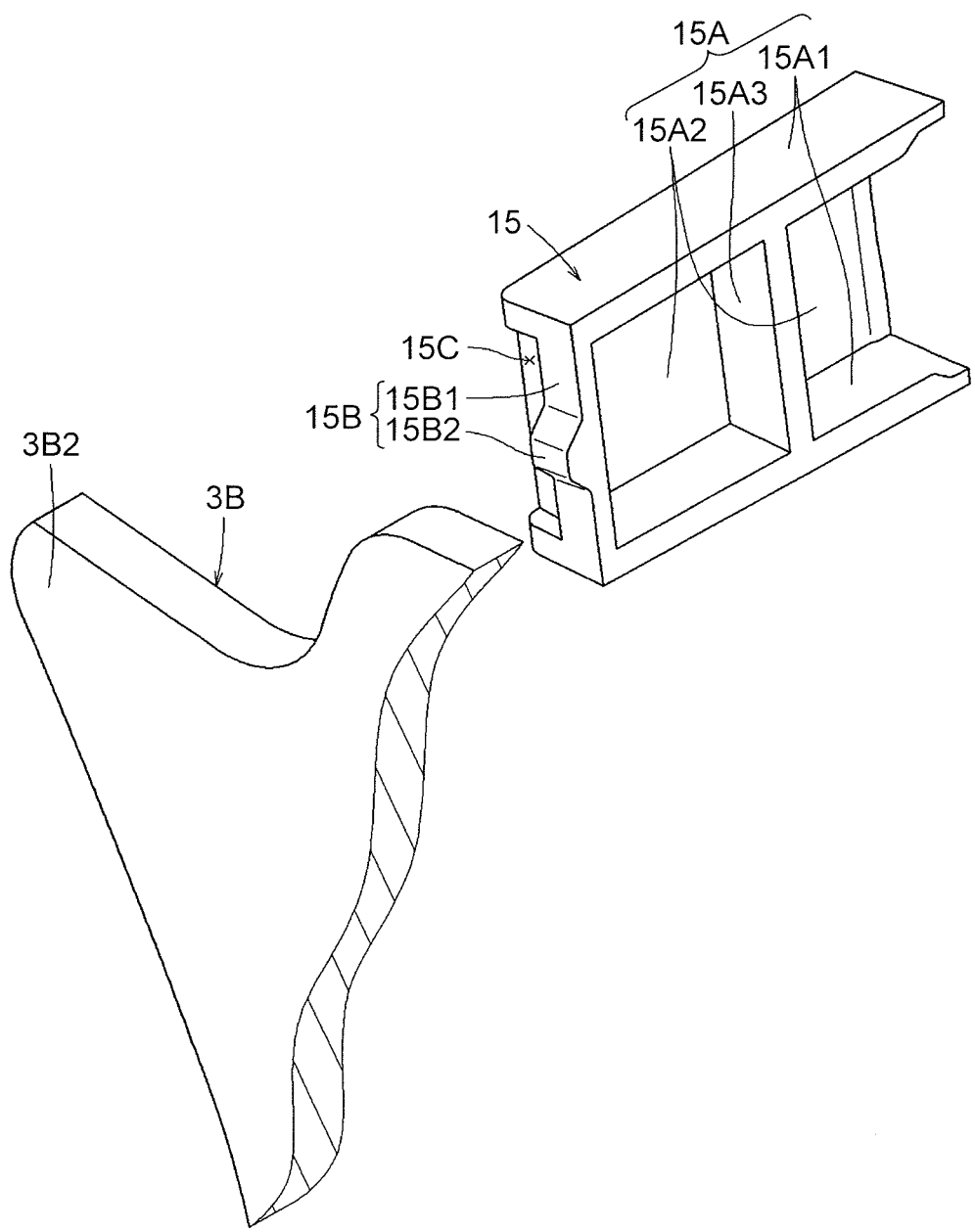
FIG. 10 is a perspective view of an elastic support portion on an enlarged scale.

As shown in FIG. 7, a pressing portion 15 that protrudes inward in the width direction is formed on the inner lateral face portion of the outer shield 10, at a position directly above the uppermost protruding wall portion 12. As shown in FIGS. 8 and 10, the pressing portion 15 includes a support portion 15A that protrudes so as to have a substantially angular U-shaped cross-section and is reinforced at some positions by a rib, and an elastic portion 15B that is formed at a distal end portion of the protruding support portion 15A. It should be noted herein that the pressing portion 15 may be regarded as "the elastic support portion" according to the invention.

Specifically, the support portion 15A includes a pair of upper and lower struts 15A1 that protrude inward in the width direction, a support wall 15A2 that is formed in such a shape as to connect the entire rear face portions of the struts 15A1 to each other, and a reinforcement rib 15A3 that is disposed to connect intermediate portions of the struts 15A1 to each other. The reinforcement rib 15A3 is configured such that a rear face portion thereof is joined to the support wall 15A2.

As shown in FIG. 10, the elastic portion 15B includes a bridge portion 15B1 that is integrally joined to distal end portions of the struts 15A1 of the support portion 15A, and a protrusion 15B2 that protrudes inward in the width direction from a central location in the bridge portion 15B1 in a bridging length direction thereof (i.e., a direction in which the bridge portion 15B1 extends). The bridge portion 15B1 is joined to the distal end portions of the struts 15A1 of the support portion 15A, but is not joined to the support wall 15A2, and is configured such that a gap 15C is formed between the entire bridge portion 15B1 and the support wall 15A2. It should be noted herein that the bridge portion 15B1 may be regarded as "the flexure portion" according to the invention.

The protrusion 15B2 is tapered inward in the width direction and has a trapezoidal cross-section, and protrudes inward in the width direction from the central location of the bridge portion 15B1 in the bridging length direction. The protrusion 15B2 is formed in a shape that has the same width in the front-rear direction as that of the bridge portion 15B1. The protrusion 15B2 has the tapered trapezoidal shape that is tapered. Thus, as shown in FIG. 8, when the protrusion 15B2 is pressed against the reclining plate 3B, the protrusion 15B2 straightforwardly receives a load in a compressive direction without buckling, i.e., without, for example, falling down sideways, and hence the protrusion 15B2 can press and bend the bridge portion 15B1, due to the shape having a wide skirt, namely, a shape that widens toward its root side.

As shown in FIG. 8, when the outer shield 10 is fitted, the distal end face of the tapered protrusion 15B2 that protrudes from the central location of the bridge portion 15B1 is pressed against the outer lateral face portion of the reclining plate 3B, so the pressing portion 15 configured as described above is fitted in such a state as to apply an elastic pressing force to the reclining plate 3B from the outside. Specifically, the protrusion 15B2 that is pressed against the outer lateral face portion of the reclining plate 3B is formed so as to protrude from the central location of the bridge portion 15B1 that is supported at both ends thereof by the struts 15A1 of the support portion 15A (i.e., that is supported between the struts 15A1). Thus, due to a force with which the protrusion 15B2 is pressed against the outer lateral face portion of the reclining plate 3B, the bridge portion 15B1 is elastically deformed such that a beam of the bridge portion 15B1 is bent (warped) outward). Thus, the pressing portion 15 is fitted in such a state as to apply an elastic pressing force to the reclining plate 3B from the outside.

The pressing portion 15 is fitted in such a state as to be elastically pressed against the outer lateral face portion of the reclining plate 3B as described above, and thus the outer shield 10 is maintained in a state where the outer shield 10 is restrained so as to prevent backlash of the outer shield 10 in the width direction with respect to the reclining plate 3B. Besides, as indicated by virtual lines in FIG. 8, even when the position of the outer lateral face portion of the reclining plate 3B in the width direction is deviated outward, the bridge portion 15B1 can be further bent (warped) outward correspondingly. Thus, the pressing portion 15 can absorb the change in the position through elastic deformation.

As shown in FIG. 4, specifically, the pressing portion 15 is pressed against a lower position in a protruding region of the rear engagement protrusion 3B2 on the outer lateral face portion of the reclining plate 3B. The pressing portion 15 is pressed against the outer lateral face portion of the reclining plate 3B at this position. Thus, in the outer shield 10, the pressing portion 15 is elastically pressed against the outer lateral face portion of the reclining plate 3B at the position that is widely distant rearward and upward from the lower-front fitting portion 14 that is attached to the side frame 3A of the seat cushion 3, that is, the pressing portion 15 is elastically pressed against the outer lateral face portion of the reclining plate 3B at a location that is far from the attachment portion attached to the side frame 3A, and that protrudes rearward and upward in a cantilever manner and is likely to move (flap) in the width direction. As a result, the backlash of the outer shield 10 is effectively prevented.

Figure 6:
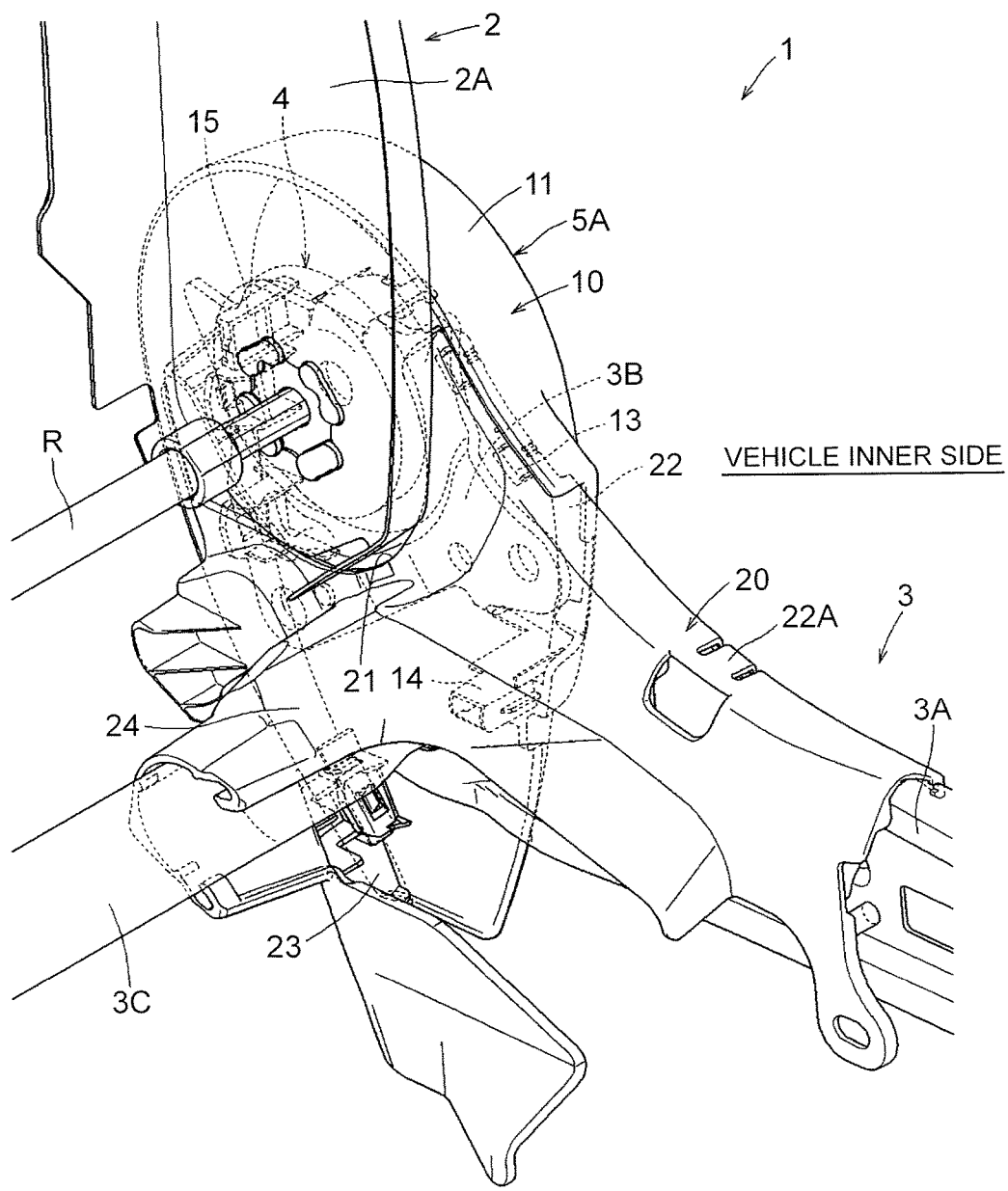
FIG. 6 is a perspective view of the connecting portion as viewed from a seat inner side.

As shown in FIGS. 5 and 6, the inner shield 20 is located between the side frame 2A of the seat back 2 and the reclining plate 3B. The inner shield 20 is formed to have a substantially plate shape, and is fitted so as to cover the peripheral edge regions in the front side, rear side, and lower side of the reclining plate 3B from the inside in the width direction, and to avoid the recliner 4 that connects the side frame 2A and the reclining plate 3B to each other. Specifically, an accommodation portion 21 that is formed by punching to have an arc shape extending along the shape of the peripheral edge of the recliner 4 is provided at the upper peripheral edge portion of the inner shield 20. Since the accommodation portion 21 is formed, the inner shield 20 is fitted so as to protrude to the positions in front of and behind the recliner 4 and to avoid the recliner 4, and covers the reclining plate 3B from the inside.

As shown in FIG. 5, the front peripheral edge portion of the inner shield 20 extends forward and downward in an inclined manner along the shape of the front peripheral edge portion of the reclining plate 3B and the upper peripheral edge portion of the side frame 3A of the seat cushion 3 that is connected to the lower portion of the reclining plate 3B. Besides, the rear peripheral edge portion of the inner shield 20 extends forward and downward in an inclined manner along the shape of the rear peripheral edge portion of the reclining plate 3B and the rear peripheral edge portion of the side frame 3A of the seat cushion 3 that is connected to the lower portion of the reclining plate 3B.

Moreover, the front hood portion 22 that protrudes outward in the width direction in the shape of a protruding wall so as to cover the reclining plate 3B and the peripheral edge portion of the side frame 3A of the seat cushion 3 from ahead or from above is formed at the front peripheral edge portion of the inner shield 20. Besides, the rear hood portion 23 that protrudes outward in the width direction in the shape of a protruding wall so as to cover the reclining plate 3B and the peripheral edge portion of the side frame 3A of the seat cushion 3 from behind or from below is formed at the rear peripheral edge portion of the inner shield 20. The fitting lugs 23A are formed to protrude at the front face portion of the rear hood portion 23 at three positions in the height direction thereof. The fitting lugs 23A are fitted from behind into and engaged with the fitting holes 12A of the respective protruding wall portions 12 that are formed at three corresponding positions in the outer shield 10, when the outer shield 10 is fitted.

A passage portion 24 that is formed by punching to have a shape that opens forward is provided at a substantially central location of the inner shield 20 in the height direction thereof. The passage portion 24 accommodates, from ahead, a circular rear pipe 3C that is disposed to connect the rear end portions of the side frames 3A of the seat cushion 3. The rear pipe 3C is fitted in a rear end portion of an opening of the passage portion 24, and hence the passage portion 24 is fitted to the rear pipe 3C. With the rear pipe 3C passed through and fitted in the passage portion 24 (see FIG. 6), the inner shield 20 is fitted into the inner lateral face portion of the side frame 3A such that an engagement lug 22A formed at the front hood portion 22 is elastically engaged with the upper edge portion of the side frame 3A of the seat cushion 3 and an engagement lug 23B formed at the rear hood portion 23 is elastically engaged with the lower edge portion of the side frame 3A. Thus, the inner shield 20 is integrally attached to the side frame 3A.

Moreover, the outer shield 10 is fitted, from the outside, to the inner shield 20 that is attached to the side frame 3A as follows. First of all, as shown in FIG. 5, the outer shield 10 is fitted to be inserted toward the inner shield 20 from the outside such that the front hood portion 22 and the rear hood portion 23 of the inner shield 20 are fitted into the hood portions 11 that protrude in the shape of a protruding wall and extend along the peripheral edge portion of the outer shield 10.

Thus, the fitting portion 14 of the outer shield 10 is inserted into and integrally fitted to the fitting hole 3A1 that is formed in the side frame 3A of the seat cushion 3, and the corresponding fitting lugs 23A of the inner shield 20 are elastically bent, and then fitted into and secured to the fitting holes 12A of the respective protruding wall portions 12 of the outer shield 10. Furthermore, a part of the front hood portion 22 of the inner shield 20 is inserted and fitted between the upper-front inclined hood portion 11 and the guide wall portions 13 of the outer shield 10. Due to the above-described actions of fitting, the outer shield 10, the inner shield 20 and the side frame 3A of the seat cushion 3 are integrally connected with one another.

Moreover, due to the above-described assembly, the pressing portion 15 that is formed on the outer shield 10 is pressed against the outer lateral face portion of the reclining plate 3B. Thus, each of the outer shield 10 and the inner shield 20 that is integrally related to the outer shield 10 is elastically pressed against the reclining plate 3B so as to prevent the backlash of the outer shield 10 and the inner shield 20 in the width direction. Thus, the connecting portion in which the seat back 2 and the seat cushion 3 are connected to each other is covered in a good-looking state in which the connecting portion is not exposed to the outside in the front-rear direction and is not exposed to the outside in the right-left direction, due to inner and outer covering structures constituted by the outer shield 10 and the inner shield 20.

To summarize the foregoing, the seat 1 according to the present embodiment of the invention is configured as follows. That is, the seat 1 includes the side frame 3A (that may be regarded as the seat frame according to the invention) of the seat cushion 3, and the outer shield 10 (that may be regarded as the shield according to the invention) that is fitted to the side frame 3A. The outer shield 10 includes the fitting portion 14 (that may be regarded as the fitting portion according to the invention) that is integrally fitted to the side frame 3A, and the pressing portion 15 (that may be regarded as the elastic support portion according to the invention) that is elastically pressed against the reclining plate 3B (that may be regarded as the seat frame according to the invention) at a position different from the position of the fitting portion 14.

Due to the adoption of this configuration, the gap that is generated between the reclining plate 3B and the outer shield 10 can be elastically suppressed at the pressing portion 15. Further, even when the position of the reclining plate 3B is set such that the reclining plate 3B slightly interferes with the pressing portion 15 in the region where the pressing portion 15 of the outer shield 10 is set, the amount of this interference can be appropriately absorbed through the flexure of the pressing portion 15.

Specifically, the pressing portion 15 includes the support portion 15A that protrudes from the outer shield 10 in the direction toward the reclining plate 3B, and the elastic portion 15B that further extends from the support portion 15A in the direction toward the reclining plate 3B and that is elastically pressed against the reclining plate 3B. The elastic portion 15B is configured to be more likely to bend than the support portion 15A in response to a load received from the reclining plate 3B. Due to the adoption of this configuration, the pressing portion 15 can be configured to be stably bent within a narrow flexible range, that is, the pressing portion 15 can be configured such that the elastic portion 15B can be bent at a position that is made close to the reclining plate 3B by the support portion 15A that protrudes from the outer shield 10.

Specifically, the elastic portion 15B includes the bridge portion 15B1 (the flexure portion) that extends from the support portion 15A in a direction perpendicular to the direction toward the reclining plate 3B, and the protrusion 15B2 that extends from the bridge portion 15B1 in the direction toward the reclining plate 3B. The elastic portion 15B is configured such that a bending load is applied to the bridge portion 15B1 by pressing the protrusion 15B2 against the reclining plate 3B. Due to the adoption of this configuration, the elastic portion I 5B can be configured to be bent in a stable deformation mode, that is, the elastic portion 15B can be configured such that the bridge portion 15B1 can be bent in a beam-bending manner by applying a bending load to the bridge portion 15B1.

Specifically, the elastic portion 15B is configured to be supported at both ends thereof by the support portion 15A. Due to the adoption of this configuration, the elastic portion 15B can be provided such that a stable large resilient force can be produced.

Further, the protrusion 15B2 is provided at the central location of the region of the elastic portion 15B, the region being supported at both ends thereof. Thus, the elastic portion 15B can be provided such that the elastic portion 15B can be efficiently bent. The elastic portion 15B is provided at the distal end portion of the support portion 15A that protrudes. Thus, the pressing portion 15 can be configured such that the elastic portion 15B can be stably bent within a narrow flexible range, that is, the elastic portion 15B can be stably bent at a position that is appropriately made closer to the reclining plate 3B.

While the embodiment of the invention has been described above, the invention can be implemented in various modes other than the above-described embodiment. For example, the vehicle seat according to the invention can also be broadly applied to seats available for various vehicles, for example, a train, an aircraft, a vessel, and a vehicle other than an automobile.

In the case where a shield has a double structure including an inner shield and an outer shield as in the case of the embodiment of the invention, the configuration of the invention may be applied to the inner shield as well as the outer shield. The shield may be fitted to a front portion of the seat cushion or a frame of the seat back.

The elastic support portion may be configured as an elastic body such that the entire elastic body is bent, instead of being configured such that only a part of the distal end side thereof that is pressed against the seat frame is bent. In the case where the elastic support portion is constituted in a two-stage manner, that is, the elastic support portion includes the support portion that protrudes from the shield in the direction toward the seat frame, and the elastic portion that further extends from the support portion in the direction toward the seat frame and that is elastically pressed against the seat frame, the elastic portion may be configured to extend from an intermediate portion of the protruding support portion instead of extending from the distal end of the protruding support portion.

As a configuration that makes the elastic portion more likely to bend than the support portion, the elastic portion may be made fragile by being formed to be hollow, bent or thinned, in addition to the configuration in which the elastic portion extends from the support portion in the direction perpendicular to the direction toward the seat frame so that a bending load is likely to be applied to the elastic portion. In the case where the elastic portion is constituted in a two-stage manner, that is, the elastic portion includes the flexure portion that extends from the support portion in the direction perpendicular to the direction toward the seat frame and the protrusion that extends from the flexure portion in the direction toward the seat frame, the protrusion is not necessarily required to have a tapered trapezoidal shape that protrudes, but the protrusion may protrude in a stumpy shape such as a circular columnar shape. Besides, protrusions may protrude from a plurality of locations in the flexure portion.

The elastic portion may be supported in a cantilever manner by the support portion. The elastic support portion may have a trampoline structure in which the elastic portion surrounds the support portion from the outer peripheral side, and holds the support portion at a plurality of locations in the circumferential direction.

What is claimed is:

1. A vehicle seat comprising:
    a seat frame; and
    a shield that is fitted to the seat frame, the shield comprising:
        a fitting portion that is integrally fitted to the seat frame; and
        an elastic support portion that protrudes from an inner face portion of the shield and that is elastically pressed against the seat frame at a position different from a position of the fitting portion.

2. The vehicle seat according to claim 1, wherein:
    the elastic support portion includes a support portion that protrudes from the shield in a direction toward the seat frame, and an elastic portion that further extends from the support portion in the direction toward the seat frame and that is elastically pressed against the seat frame; and
    the elastic portion is configured to be more likely to bend than the support portion in response to a load received from the seat frame.

3. The vehicle seat according to claim 2, wherein:
the elastic portion includes a flexure portion that extends from the support portion in a direction perpendicular to the direction toward the seat frame, and a protrusion that extends from the flexure portion in the direction toward the seat frame; and
the elastic portion is configured such that a bending load is applied to the flexure portion by pressing the protrusion against the seat frame.

4. The vehicle seat according to claim 3, wherein the elastic portion is configured to be supported at both ends thereof by the support portion.

5. The vehicle seat according to claim 4, wherein the protrusion is provided at a central location of a region of the elastic portion, the region being supported at both ends thereof.

6. The vehicle seat according to claim 2, wherein the elastic portion is provided at a distal end portion of the support portion that protrudes.

* * * * *